United States Patent
Mustajärvi

(10) Patent No.: US 6,430,163 B1
(45) Date of Patent: Aug. 6, 2002

(54) ALLOCATION OF CONTROL CHANNEL IN PACKET RADIO NETWORK

(75) Inventor: Jari Mustajärvi, Espoo (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/194,572

(22) PCT Filed: Mar. 27, 1998

(86) PCT No.: PCT/FI98/00281

§ 371 (c)(1),
(2), (4) Date: Nov. 27, 1998

(87) PCT Pub. No.: WO98/44639

PCT Pub. Date: Oct. 8, 1998

(30) Foreign Application Priority Data

Mar. 27, 1997 (FI) .................................................. 971320
Apr. 11, 1997 (FI) .................................................. 971537

(51) Int. Cl.$^7$ .................................................. H04J 3/24
(52) U.S. Cl. ................................. 370/310; 370/449
(58) Field of Search ................................. 370/310, 329, 370/348, 508, 280, 349, 449

(56) References Cited

U.S. PATENT DOCUMENTS

| | | | |
|---|---|---|---|
| 5,355,368 A | | 10/1994 | Dore et al. |
| 6,031,832 A | * | 2/2000 | Turina .......................... 370/348 |
| 6,201,819 B1 | * | 3/2001 | Luders .......................... 370/508 |
| 6,226,279 B1 | * | 5/2001 | Hansson et al. ............. 370/329 |

FOREIGN PATENT DOCUMENTS

| | | |
|---|---|---|
| EP | 539 220 | 4/1993 |
| GB | 2 279 205 | 12/1994 |
| GB | 2 305 081 | 3/1997 |
| WO | 95/20283 | 7/1995 |
| WO | 96/33586 | 10/1996 |
| WO | 97/15994 | 5/1997 |

OTHER PUBLICATIONS

"Digital cellular telecommunications system (Phase 2+); General Packet Radio Service (GPRS); Overall Description of the General Packet Radio Service (GPRS) Radio Interface; Stage 2; (GMS 03.64)", GSM Technical Specification, Mar. 3, 1997, Version 1.2.0, pp. 1–47.

"GPRS RLC/MAC Block Formats (2)", Tdoc SMG2 GPRS 174/97, Jan. 22–24, 1997, pp. 1–16.

* cited by examiner

*Primary Examiner*—David Vincent
*Assistant Examiner*—Alexander O. Boakye
(74) *Attorney, Agent, or Firm*—Pillsbury Winthrop LLP

(57) ABSTRACT

A method for allocating a packet associated control channel to mobile stations in a packet radio system, particularly in a GPRS system. The sends a resource allocation request, to which a network responds by allocating to the mobile station a TFI identifier and a USF identifier. The network then sends data packets in blocks, at least some of which comprise a polling field (SIP), a polling state which indicates that the mobile station is to acknowledge received data packets on the control channel. To ensure that a mobile station receiving in downlink would not prevent the network from allocating one uplink mobile station to said channel, the allocation of the packet associated control channel is, in accordance with the invention, independent of a possible USF identifier.

13 Claims, 2 Drawing Sheets

ALLOCATION OF CONTROL CHANNEL IN PACKET RADIO NETWORK

This application is a national phase of international application PCT/FI98/000281 filed Mar. 27, 1998 which designated the U.S.

BACKGROUND OF THE INVENTION

The invention relates to packet radio systems in general and particularly to a method and arrangement for providing independence between uplink and downlink in a packet radio network, preferably in a mobile station packet radio network such as a General Packet Radio Service (GPRS).

The GPRS is a new service in the GSM system and an object of standardization in the GSM phase 2+ in the ETSI (European Telecommunication Standard Institute). The operational environment in the GPRS comprises one or more subnetwork service areas interconnected by a GPRS Backbone Network. A subnetwork comprises a plurality of packet data service nodes, which are here referred to as GPRS support nodes (or agents), each of which is connected to the GSM mobile network so as to be able to offer a packet data service to mobile data terminal equipment via a plurality of base stations, i.e. cells. An intermediate mobile network offers circuit-switched or packet-switched data transmission between a support node and mobile data terminal equipment. The separate subnetworks are, in turn, connected to an external data network, e.g. to a PSPDN (Public Switched Packet Data Network). The GPRS service thus allows packet data transmission to be provided between mobile data terminal equipment and external data networks, with the GSM network functioning as an interface network.

With reference to FIG. 1, a typical arrangement of a GPRS network will be described. It is to be understood that the architecture in the GPRS systems is not as mature as in the GSM systems. All GPRS terminology should therefore be understood to be descriptive and not restrictive. A typical mobile station functioning as a mobile data terminal comprises a mobile station MS of a mobile network and a portable personal computer PC connected to said MS through a data interface. The mobile station can be for instance a Nokia 2110 manufactured by Nokia Mobile Phones/Finland. By means of a PCMCIA-type Nokia Cellular Datacard, manufactured by Nokia Mobile Phones/Finland, the mobile station can be connected to any portable personal computer PC provided with a PCMCIA card slot. The PCMCIA card thus provides the PC with an interface point supporting a telecommunication application protocol, such as a CCITT X.25 or an Internet Protocol IP, used on the PC. The mobile station can optionally provide a direct interface point supporting a protocol used by the PC application. A further possibility is that the mobile station MS and the computer PC are integrated into a single entity, within which the application software is provided with an interface point supporting the protocol it uses. An example of such a mobile station comprising an integrated computer is Nokia Communicator 9000, which is also manufactured by Nokia Mobile Phones/Finland.

Network elements Base Station Controller (BSC) and Mobile Switching Center (MSC) are known in a typical GSM network. The arrangement shown in FIG. 1 comprises a separate Serving GPRS Support Node (SGSN) of the GPRS service. The support node performs certain packet radio service operations in the network. Such operations include registration of the mobile stations MS in and out of the system, updating of routing areas of the mobile stations MS and routing of data packets to their correct destinations. Within the present application the term 'data' is to be understood in a broad sense to refer to any information transmitted in a digital telecommunication system. Such information can comprise speech, inter-computer data traffic, telefax data and short program code sequencies, etc., encoded into a digital form. The SGSN node can be located at a base station BTS, a base station controller BSC or a mobile switching center MSC, or separate from all these elements. The interface between an SGSN node and a base station controller BSC is called a Gb interface. An area controlled by one base station controller BSC is called a Base Station Subsystem (BSS). Uplink refers to a direction from a mobile station MS to a network and downlink refers to a reverse direction.

In the present application, the term 'a standard proposal' refers jointly to the proposals for ETSI GPRS standards, particularly to 3.64 and to supplementing proposals sent for it, particularly to Tdoc SMG2 GPRS 174/97. One of the principles of the GPRS system is that uplink and downlink capacity deployment should be independent of each other. With reference to FIG. 2, an area, significant to the understanding of the invention, of a radio resources arrangement according to the standard proposal will be described. Traffic over an air interface Um is relayed in blocks produced by a physical layer of the OSI model. Each physical block has a duration of four GSM bursts (456 bits in total), which are sent in succession on one physical channel. The amount of data carried by a physical block depends on the channel coding to be used, for which four different coding methods have been defined, i.e. CS-1, . . . , CS-4. The different coding methods are not, however, significant to the understanding of the invention.

With reference to FIG. 3, an allocation of radio resources will be described in relation to a mobile terminating connection. Item 6.6.4.5. of the standard proposal is considered to represent the prior art. Message fields, such as a TFI and a USF, will be described later in connection with FIG. 4. In FIG. 3, time proceeds from top to bottom. The Figure shows on the right-hand side, next to messages, said logical channels on which the messages can be sent. The channel used is not, however, significant to the understanding of the invention.

In step 3-0, the network searches for a mobile station on a paging channel, i.e. it sends a Packet Paging Request message on a paging channel PPCH or PCH. In step 3-1, the mobile station sends a channel allocation request Packet Channel Request on a random access channel PRACH or RACK In the channel allocation request the mobile station can request the network to allocate to it one or two time slots. In step 3-2 the network can grant an access on a Packet Access Grant channel (immediate Assignment). In step 3-3 the mobile station sends an Logic Link Control (LLC) frame which is relayed to the SGSN to inform the SGSN that the mobile station has moved to a 'Ready' state.

The allocation of radio resources (for instance in step 3-2) involves e.g. that the network allocates to the mobile station the identifiers Temporary Flow-Identifier (TFI) and Uplink State Flag (USF). The mobile station can use one or two time slots allocated to it for sending data, or it can use the radio resources allocated to it for requesting more resources. Let us assume that the resources allocated to the mobile station by the Immediate Assignment message are not sufficient and in step 34 the network sends a Packet Resource Assignment message.

The Packet Resource Assignment message comprises e.g. the TFI identifier allocated to the connection; a list (in a bit chart form) of Packet Data Channels PDCH that the network uses for sending a packet; and a Packet Associated Control Channel PACCH that the mobile station is to use for acknowledging received RLC blocks (the channel being indicated by the USF allocated to the mobile station). In addition, the message can comprise e.g. information related to a timing advance and power control.

After the radio resources are allocated, the network sends in step 3-5 to the mobile station data packets provided with a header that comprises a polling field, i.e. a Supplementary/ Polling bit S/P. If the S/P field is in a polling state 'P' (i.e. the S/P bit is 1), the mobile station is to acknowledge in step 3-6 the received data packets with a positive or a negative acknowledgement Packet Ack/Nack. The indication 'N times' in FIG. 3 means that the steps 3-5 and 3-6 below the dashed line are repeated for as along as the network has packets to send.

With reference to FIG. 4, the radio blocks and the fields used in them will be now described in greater detail. Each radio block comprises three parts: a MAC header, an RLC block and a Block Check Sequence BCS. The MAC header (octet 1) comprises e.g. an Uplink State Flag USF, a type field T and a Power Control field PC. A value 0 of the type field T denotes an RLC data block and a value 1 an RLC/MAC control block.

The RLC data block (in which T=0) comprises an RLC Header and an RLC information field. The RLC header (octets 2 to 3) denotes e.g. the position of the block in relation to other blocks in the sequence (BSN=Block Sequence Number). In addition, the RLC header comprises allocation and LLC frame data. An Extension bit field E shows whether an optional extension octet 4 is in use. According to the standard proposal, the intended use of the field S/P in connection with data blocks is that when said bit is in the polling state 'P', the mobile station is to send an acknowledgement (Ack/Nack) of the received blocks. The Temporary Flow Identity field TFI is used in downlink blocks to denote a receiving mobile station. The 7 bits allocated to the TFI field can be used for denoting 127 mobile stations ($2^7$=128), because one of the values is reserved for general transmissions received by all mobile stations.

In downlink blocks the USF field is used to provide a mobile station-specific authorization for transmitting a corresponding uplink block. So in a downlink block, the USF field provides an identifier of an uplink counter block. The USF field comprises 3 bits, i.e. it can acquire 8 different values. One USF field value is allocated to the mobile station receiving the packet, to denote the uplink block the mobile station is to use for acknowledging the received radio blocks. At the same time the mobile station can express its wish to use a separate uplink data channel.

A problem with an arrangement described above arises from the USF identifier allocated in connection with the allocation of the downlink resource. Since the USF identifier is also allocated to the receiving mobile station, the same USF identifier value cannot be allocated for uplink transmissions. Since the USF identifier can acquire only a limited number of possible values (i.e. eight different values), each mobile station receiving in downlink prevents the network from allocating a particular uplink mobile station to the channel in question. If at a particular moment one and the same channel is used for reception by 8 separate mobile stations, a corresponding uplink channel cannot have any separate transmissions, even if plenty of air interface capacity would be available.

A possible solution could be to increase the USF field to comprise more than three bits. The problem would thus become less significant, even if the uplink and downlink were not independent of each other. Another alternative solution could be a separate information field (=a bit) indicating whether the USF identifier is in use or not. At least one problem with these solutions would be that the USF field is strongly protected with channel coding, so it uses (with CS-1 coding) up to four times more bandwidth in relation to the net information content. Such an additional load reduces the capacity available to payload traffic.

BRIEF DESCRIPTION OF THE INVENTION

The invention is firstly based on a detection of a problem, which is a false reasoning behind the standard proposal. In addition to the detection of the problem, an object of the invention is to provide a mechanism that allows the above-mentioned problem to be solved. The object of the invention is achieved with a method characterized by what is stated in the independent claims. The dependent claims relate to the preferred embodiments of the invention.

In the invention, allocation of a Packet Associated Control Channel (PACCH) is not dependent of a possible USF identifier. Instead, a mobile station acknowledges data packets received, after a predetermined time, from a downlink block in which said polling field is in a polling state. When the allocation of the control channel PACCH is independent from the USF identifier allocated to the mobile station, the invention implements a principle of the GPRS system according to which uplink and downlink capacity deployment should be independent of each other. According to the invention, when the mobile station sends the acknowledgement, the USF identifier in the corresponding downlink block must be one that has not been allocated to any mobile station, so as to avoid collision in the transmissions sent by mobile stations.

BRIEF DESCRIPTION OF THE DRAWINGS

In the following the invention will be described in greater detail in connection with preferred embodiments and with reference to the attached drawings, in which

FIG. 2 illustrates protocol layers that the invention relates to;

DETAILED DESCRIPTION OF THE INVENTION

Figure 1:
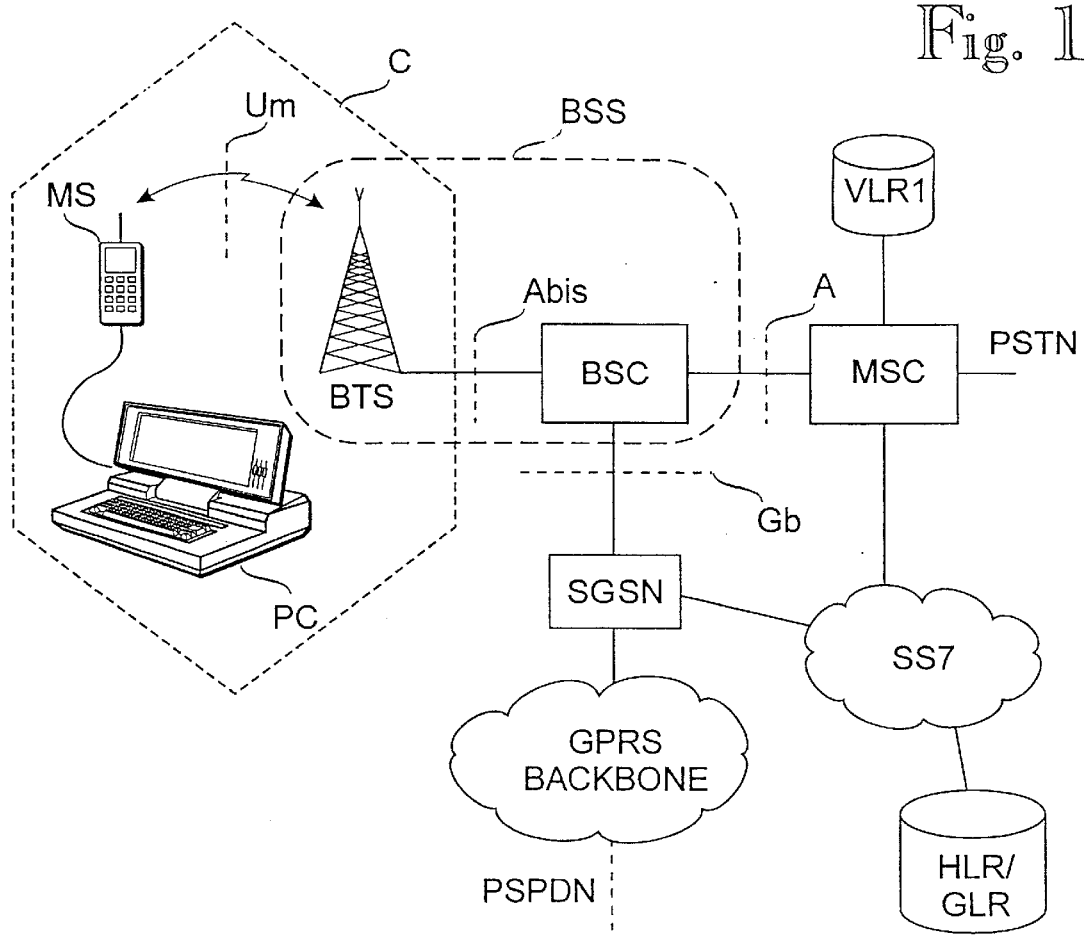
FIG. 1 is a block diagram illustrating elements of a packet radio system relating to the invention.
Figure 2:
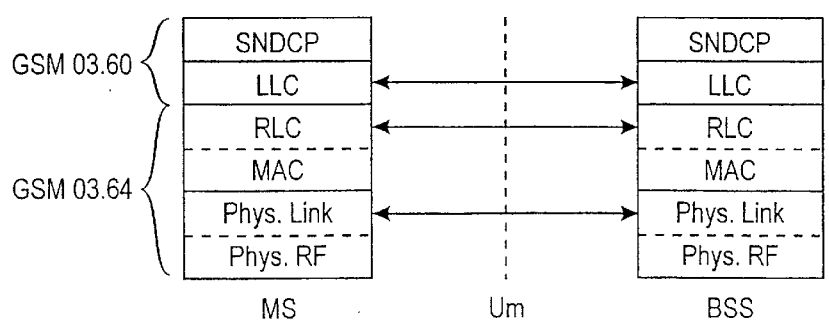
Figure 3:
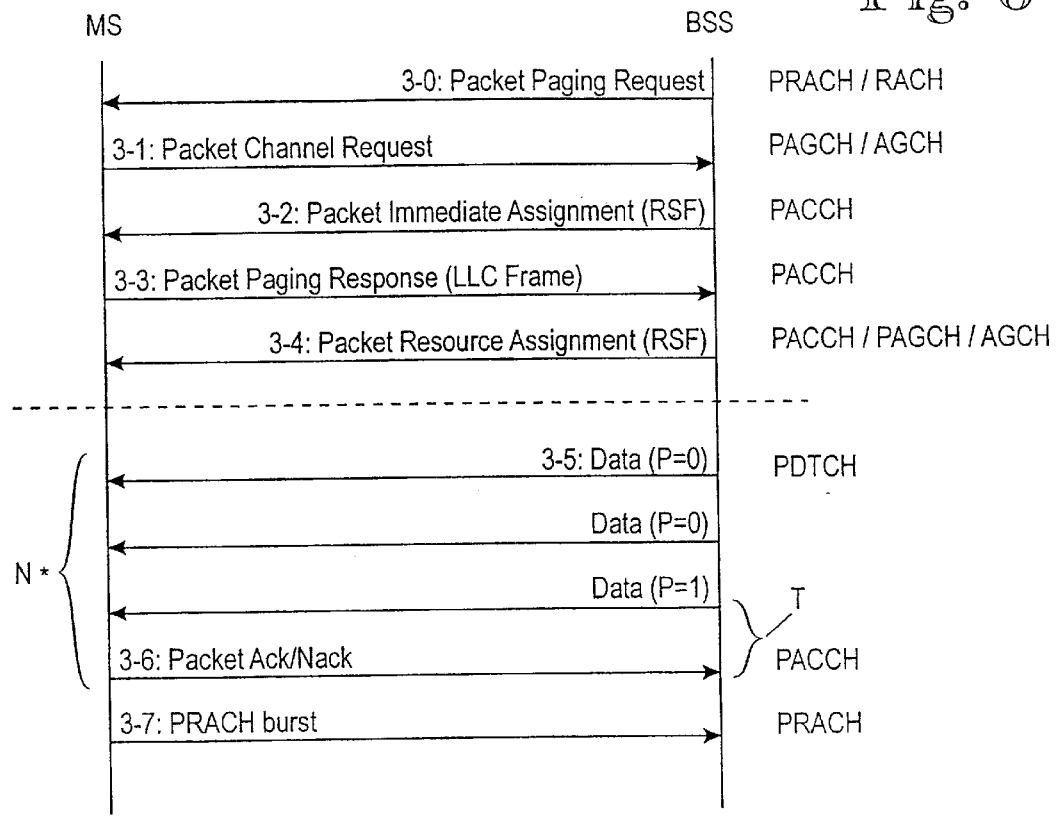
FIG. 3 illustrates allocation of radio resources.

In the invention, a packet associated control channel PACCH is thus not allocated, as in the standard proposal, by using an uplink state flag USF identifier. Instead, a mobile station acknowledges, after a predetermined time, a block in which a downlink P bit is set. According to a first (primary) embodiment of the invention, the predetermined time is simply a fixed period of time. In FIG. 3 the time is shown with a reference sign T, which denotes the time from the block in which P=1 to the block in step 3-6, in which the mobile station sends the acknowledgement. This can be easily implemented in such a way that after the active P bit, the mobile station waits for a fixed number of blocks before it sends the acknowledgement. This implementation of the invention does not even require changes to the identifier part of the standard proposal. The most essential change is primarily that a polling field S/P receives an additional meaning, i.e. a set P bit is used (in addition to the meaning given in the standard proposal) to implicitly denote an allocation of an uplink block which, after a predetermined time T, follows the downlink data block in which the P bit is 1.

The predetermined time T is most advantageously set as short as possible so as to enable the network to receive, as quickly as possible, information about the success or failure of the data transmission. The time T should, however, be long enough to allow a mobile station provided with a single set of radio parts to change, even with a maximum timing advance, from reception to transmission.

Figure 4:
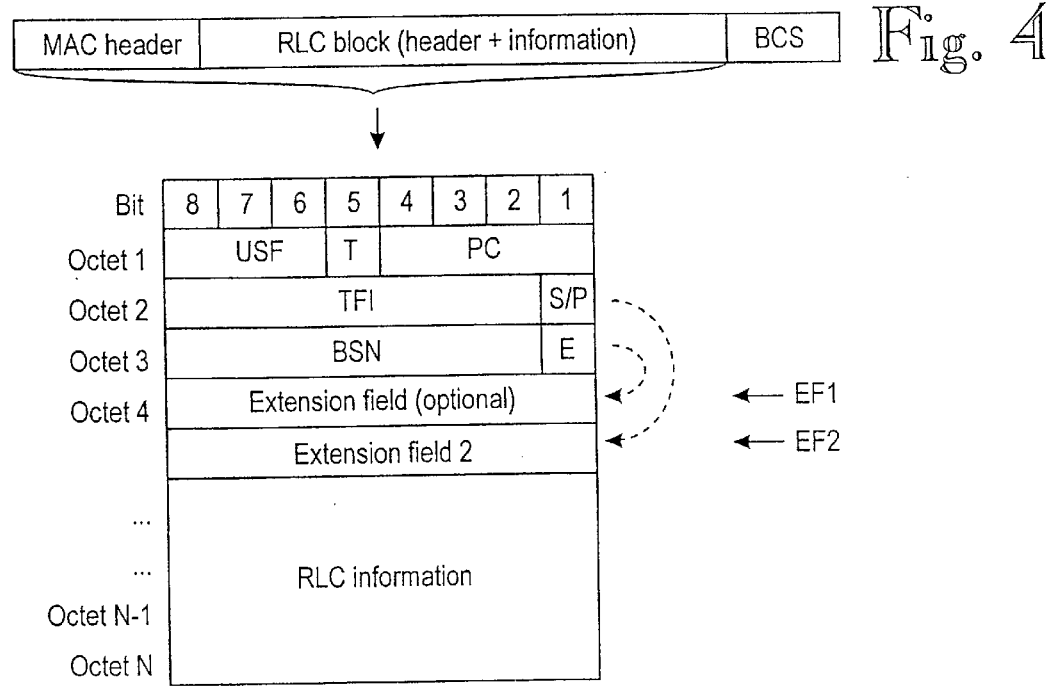
FIG. 4 illustrates a structure of blocks transmitting on the radio path.

According to a second embodiment of the invention, the P bit denoting polling is interpreted in such a way that an Extension Field 2 (EF2) of the invention shown in FIG. 4 denotes the block in which the mobile station is to send the acknowledgement. The easiest way to implement this is to have the additional extension field EF2 in the identifier part of a downlink RLC block to denote a proportional time shift, i.e. the number of blocks from the block in which the P bit is set to the block in which the mobile station is to acknowledge the received data blocks. One modification of this embodiment is to use any existing field in a new manner in the same way as an S/P field can be used for the purpose of the invention in addition to the use according to the standard proposal, as was described above.

The arrows shown with curved dash lines in FIG. 4 illustrate how the fields E and S/P denote the occurrence of additional extension fields. The set E bit denotes the occurrence of an Extension Field EF1 of the standard proposal. The correspondingly set P bit (the S/P field in the state 'P') denotes the occurrence of the extension field EF2 of the invention. The additional extension field EF2 is shown as a separate octet, but it does not necessarily need to be an entire octet.

If the network, for instance due to an obstacle in the terrain, cannot receive the acknowledgement sent by the mobile station, it can provide a new resource by means of a new downlink radio block allocated to said mobile station. The block does not carry any new user data, but only the allocation of the resource for a new acknowledgement transmission (the S/P bit in the state 'P'). The mobile station should continue listening during a few blocks after the last acknowledgement is sent.

According to the standard proposal, each mobile station to which a radio resource has been allocated should regularly transmit a random access burst, i.e. a PRACH burst, to the network (PRACH=Packet Random Access Channel). The random access burst is transmitted using an idle burst bound to a USF field. In FIG. 3 this function is illustrated in step 3-7. The mechanism is described on page 30 of the standard proposal. Each superframe comprises four multiframes which include altogether 16 idle bursts. According to the standard proposal, all even idle bursts are allocated to the mobile stations on the channel in question using the USF field. Since in this case, according to the invention, the channel is not allocated on the basis of the USF field, it is not immediately evident how the mobile station knows when to send the necessary PRACH burst or whether it can be send at all.

There are at least two alternative solutions to this subproblem, which both are based on the same idea, i.e. instead of the USF identifier a random access burst identifier of a similar size, referred to as an RSF (Random access burst Status Flag) in this application, is allocated to the mobile station in connection with downlink allocation of resources (steps 3-2 and/or 3-4). The size of the RSF identifier is advantageously same as that of the USF, i.e. it may be given a value from 0 to 7.

According to an alternative embodiment an even idle burst corresponds to each RSF like an odd idle burst corresponds to the USF.

According to another embodiment, superframing is increased from four to eight multiframes. In that case, the number of idle bursts is 32, 8 of which are allocated to the USF and 8 to the RSF. (The remaining 16 bursts are left free or reserved for other purposes.) As regards mobile stations, this means that the transmission interval of PRACH bursts would increase from one second to two seconds. This will cause no practical problems because one change of timing advance corresponds to a change of 500 meters in distance. For example, high-speed trains travel only approximately 80 meters per second.

It is apparent to a person skilled in the art that as technology advances, the basic idea of the invention can be implemented in various different ways. The invention and its embodiments are therefore not restricted to the above-described examples, but they can vary within the scope of the claims.

What is claimed is:

1. A method for allocating a control channel to one of a plurality of mobile stations in a packet radio system for a downlink transmission, comprising:

sending a resources allocation request to the packet radio system via the one of a plurality of mobile stations;

responding to the resources allocation request by the packet radio system allocating a control channel and possibly an uplink status flag to the one of a plurality of mobile stations; and sending data packets in blocks, at least some of which comprise a polling field which, when in a polling state, indicates that the one of a plurality mobile stations is to acknowledge received data packets on the control channel allocated to it;

allocating the control channel to the one of a plurality of mobile stations independently of a possible uplink status flag;

acknowledging, by the one of the plurality of mobile status, the data packets received after a predetermined time from a downlink block in which said polling field is in said polling state;

reserving the uplink block at time T for a polling acknowledgement from the one of a plurality of mobile stations after receiving a downlink block with a polling filed that is in the polling state; and making no assignment of an uplink status flag allocation to any other mobile station.

2. The method according to claim 1, wherein the predetermined time T is fixed.

3. The method according to claim 2, further comprising allocating a random access burst identifier to the mobile station in connection with downlink allocation of resources to inform about a timing advance.

4. The method according to claim 1, wherein the predetermined time T corresponds to a fixed number of blocks.

5. The method according to claim 4, further comprising allocating a random access burst identifier to the mobile station in connection with downlink allocation of resources to inform about a timing advance.

6. The method according to claim 1, wherein the predetermined time T is defined in such a way that the downlink data blocks, in which said polling field is in the polling state, comprise an additional extension field denoting the uplink block in which the mobile station is to acknowledge the received data packets.

7. The method according to claim 4, wherein said additional extension field denotes the number of the blocks from the downlink data block, in which said polling field is in the polling state to the uplink block in which the mobile station is to acknowledge the received data packets.

8. The method according to claim 6, further comprising allocating a random access burst identifier to the mobile station in connection with downlink allocation of resources.

9. The method according to claim 7, further comprising allocating a random access burst identifier to the mobile station in connection with downlink allocation of resources.

10. A method according to claim 1, further comprising allocating a random access burst identifier to the mobile station in connection with downlink allocation of resources to inform about a timing advance.

11. The method according to claim 10, wherein the blocks are transmitted as sequences which are repeated so that an idle burst recurs at intervals of a few blocks, and at least some of the idle bursts are allocated to the random access burst identifiers.

12. The method according to claim 7, wherein every other idle burst is allocated to the random access burst identifiers.

13. The method according to claim 1, wherein the packet radio system is a General Packet Radio Service systems.

* * * * *